(12) United States Patent
Chen

(10) Patent No.: US 8,231,099 B2
(45) Date of Patent: Jul. 31, 2012

(54) PROTECTIVE COVER SUPPORT RACK FOR PORTABLE ELECTRONIC DEVICES

(75) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 197 days.

(21) Appl. No.: 12/765,184

(22) Filed: Apr. 22, 2010

(65) Prior Publication Data

US 2011/0260014 A1 Oct. 27, 2011

(51) Int. Cl.
*A47G 29/00* (2006.01)

(52) U.S. Cl. .......... 248/688; 248/461; 248/917; 40/753; 40/781

(58) Field of Classification Search .................. 248/688, 248/444.1, 455, 457, 461, 470, 917; 40/724, 40/753, 781; 361/679.02, 679.3
See application file for complete search history.

(56) References Cited

U.S. PATENT DOCUMENTS

| | | | | |
|---|---|---|---|---|
| 3,773,154 A * | 11/1973 | Mitchell | | 190/11 |
| 4,432,152 A * | 2/1984 | Daenen | | 40/762 |
| 5,068,987 A * | 12/1991 | Tontarelli | | 40/753 |
| 6,003,831 A * | 12/1999 | Coleman | | 248/688 |
| 6,008,983 A * | 12/1999 | Yen | | 361/679.11 |
| 6,646,864 B2 * | 11/2003 | Richardson | | 361/679.3 |
| 6,768,635 B2 * | 7/2004 | Lai et al. | | 361/679.11 |
| 7,149,080 B2 * | 12/2006 | Jackson, Jr. | | 361/679.21 |
| 7,299,580 B2 * | 11/2007 | Wang et al. | | 40/719 |
| 7,663,879 B2 * | 2/2010 | Richardson et al. | | 361/679.56 |
| 7,841,575 B1 * | 11/2010 | Sliger | | 248/454 |
| 7,907,394 B2 * | 3/2011 | Richardson et al. | | 361/679.3 |
| 7,950,617 B2 * | 5/2011 | Zhu et al. | | 248/469 |
| 7,986,514 B2 * | 7/2011 | Wang et al. | | 361/679.02 |
| 2003/0142470 A1* | 7/2003 | Krieger et al. | | 361/683 |
| 2003/0222149 A1* | 12/2003 | Solomon et al. | | 235/472.01 |
| 2005/0052831 A1* | 3/2005 | Chen | | 361/680 |
| 2007/0223184 A1* | 9/2007 | Garrett | | 361/681 |
| 2008/0016742 A1* | 1/2008 | Hao | | 40/753 |
| 2008/0247127 A1* | 10/2008 | Finnegan | | 361/681 |
| 2010/0238119 A1* | 9/2010 | Dubrovsky et al. | | 345/169 |
| 2011/0036965 A1* | 2/2011 | Zhang et al. | | 248/688 |

* cited by examiner

*Primary Examiner* — Bradley Duckworth
(74) *Attorney, Agent, or Firm* — Rosenberg, Klein & Lee

(57) ABSTRACT

A protective cover support rack for electronic devices includes at least a protective cover body, a support lid and a hinge assembly. The protective cover body has an inner rim with an annular U-shaped trough formed thereon to hold and encase the body of an electronic device, and a lower half portion to cover the back side of the electronic device. The support lid can be adjusted at an angle smaller than 360 degrees to allow users to swivel to the front side as required to protect the screen of the electronic device, or adjust to a standing position to facilitate viewing, or fold it to fully in contact with back side of the protective cover body at a storing position, or swivel to facilitate hand grasping in use.

6 Claims, 10 Drawing Sheets

PROTECTIVE COVER SUPPORT RACK FOR PORTABLE ELECTRONIC DEVICES

BACKGROUND OF THE INVENTION

1. Field of the Invention

The present invention relates to a protective cover support rack for electronic devices and particularly to a protective cover support rack to protect the screen of an electronic device or support its standing and also is foldable quickly for storing and extendable to serve as a handle to enhance use diversity and improve practicality.

2. Description of the Prior Art

Computers have advanced greatly in recent years, evolving from a bulky set housed in a computer room to become personal computers and notebook computers, and now become touch control portable electronic device 1 (referring to FIG. 1), such as smart phones, tablet computers, smart handsets and the like. It generally has a touch screen 10 allowing users to directly select targeted items intuitively on the computer screen, and with two or more fingers splaying or closing to zoom the icons or texts on the screen larger or smaller. The touch screen provides an operation interface that brings the users closer to the screen 10 and is much more straightforward and handy than the conventional keyboard operation. Moreover, with the portable electronic device 1 formed in a single slat structure, users can flexibly operate and maneuver by touching on the screen 10.

While the portable electronic device 1 is simply structured and very neat in profile, and often creates a great appeal to the users, its surface is prone to be scraped or smeared and results in an undesirable aesthetic appearance. To remedy this problem, protective covers made from various types of materials have been developed and introduced on the market. Those protective covers usually encase the back side of the electronic device and have a carved out portion to expose the screen to facilitate operation. They aim to protect the appeal of the surface of the device. However, many portable electronic devices are formed in a one slate structure without an extra support means, such as the tablet computer which usually is formed a relative larger size. When in use a user has to hold and bear the weight of the computer with one hand and maneuver with another hand, or has to raise the display screen in a standing manner with one palm to see the screen at an optimal angle even if it is rested on a table or user's laps. It is inconvenient and troublesome, and easily causes physical fatigue of user's hands when used in a prolonged duration. Moreover, the portable electronic device, aside from being operated with two hands, also has to be held firmly by the hands to prevent dropping. This also tends to cause fatigue of the hands in a long duration. In addition, the portable electronic device 1 is mostly designed with a streamline and smooth profile to enhance aesthetic appeal, that makes hand holding even more difficult.

Furthermore, the general tablet computer is mainly designed for users to use in a handheld manner, given a common ten inches screen, the size of the tablet computers usually is 18 cm×24 cm, and weighs at least 500 g. With a user holding one side of the computer by one hand and operating the touch screen with another hand, the hand grasping the screen has to bear the weight of the computer, and the gravity center of the computer is not on the hand grasping portion, and a levering force caused by the gravity force has to be born by the hand. This increases the load of the hand and reduce the sustainable time of the hand, and also increases the fatigue and burden of user's hands and arms.

SUMMARY OF THE INVENTION

In view of the aforesaid problems occurred to the conventional portable electronic device, the primary object of the present invention is to provide a protective cover support rack for portable electronic devices to protect the screen of an electronic device, support it in a standing manner to facilitate viewing and also make storing and holding easier.

To achieve the foregoing object, the invention includes at least a protective cover body, a support lid and a hinge assembly. The protective cover body has an inner rim with an annular U-shaped trough formed thereon to hold and encase the body of an electronic device, and a lower half portion to cover the back side of the electronic device. The hinge assembly includes two hinge means each has one end fastened to one lateral side of the protective cover body and another end fastened to the bottom side of the support lid. Thereby the support lid can be adjusted in a space at an angle smaller than 360 degrees to allow users to swivel to the front side to protect the screen of the electronic device, or adjust to a standing position to facilitate viewing, or fold it to fully in contact with back side of the protective cover body for storing, or swivel to facilitate hand grasping in use, thus provide diversified usages and improve practicality.

The protective cover body includes an upper half portion and a lower half portion that are coupled together. The upper half portion is made from a hard material (such as plastics, ABS, PC, metal or the like) to provide desirable support strength to bear the weight of the electronic device. The lower half portion is made from a pliable material (such as rubber, leather or the like) that is resilient to facilitate coupling of the electronic device with the protective cover body.

The support lid has a bottom side fastened to the hinge means and another side formed a grip aperture to facilitate insertion of user's fingers for grasping. The grip aperture is formed at a width greater than 3 cm and longer than 8 cm. Hence when the support lid is flipped outwards to a horizontal position or close to the horizontal position, user' fingers can insert into for grasping to alleviate the burden of user's arm and make operation of the electronic device easier.

The hinge assembly includes two hinge means which have at least one resistant hinge consisting of a spring butting a movable slider to provide the support lid an adjustable swivel space within 360 degrees, and can hold the electronic device and entire protective support rack at any adjusted angle when external forces are absent without moving angularly.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
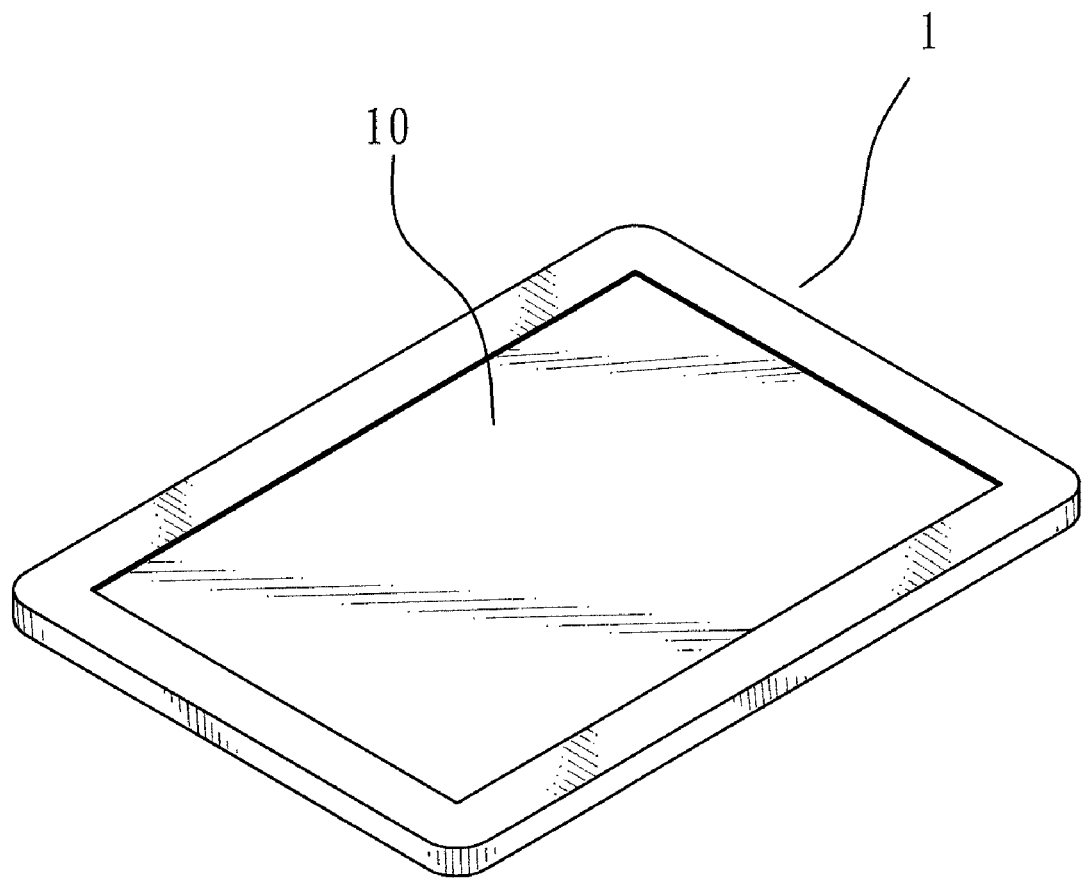
FIG. 1 is a perspective view of a conventional portable electronic device.
Figure 2:
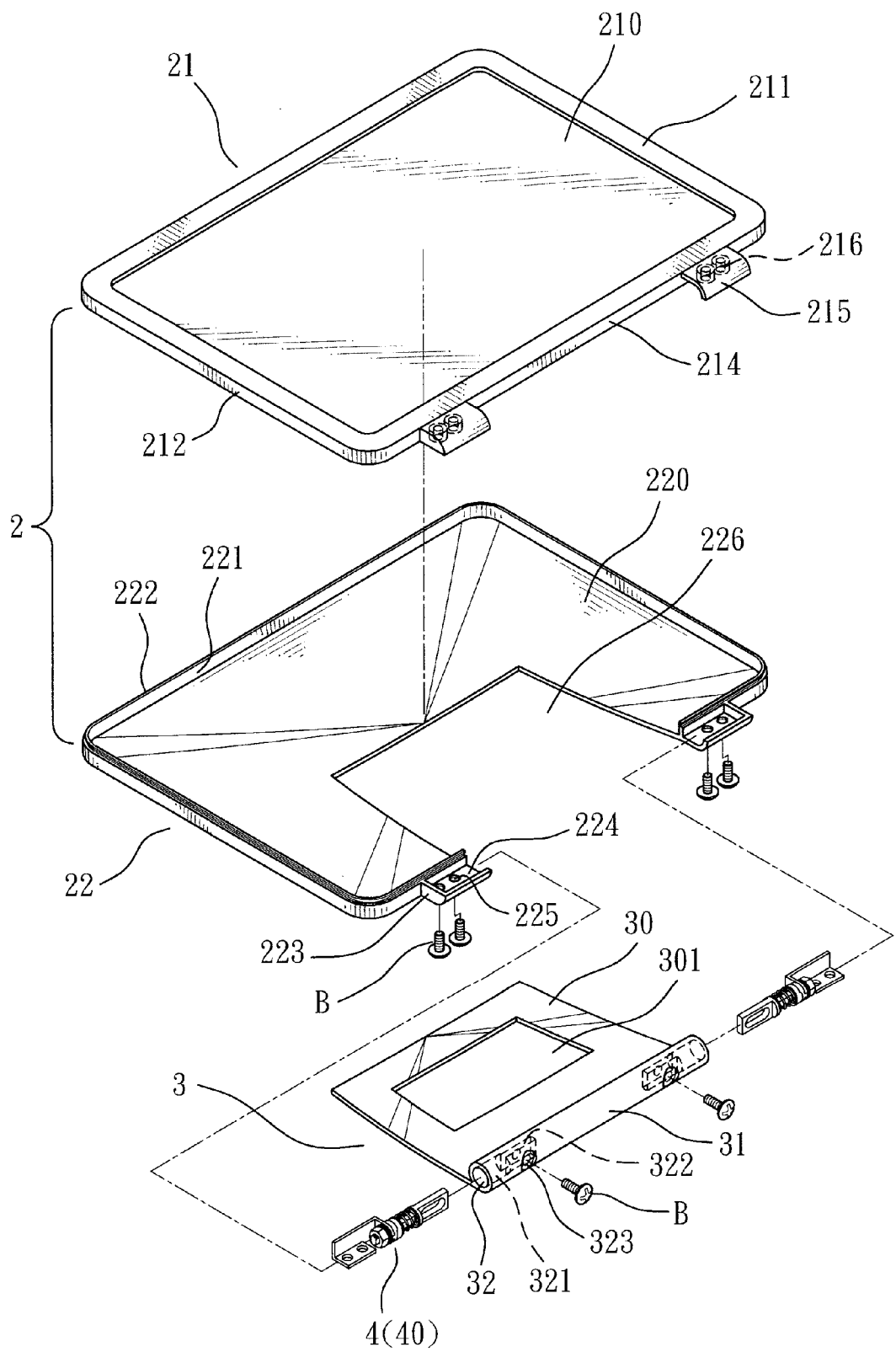
FIG. 2 is an exploded view of the invention.
Figure 3:
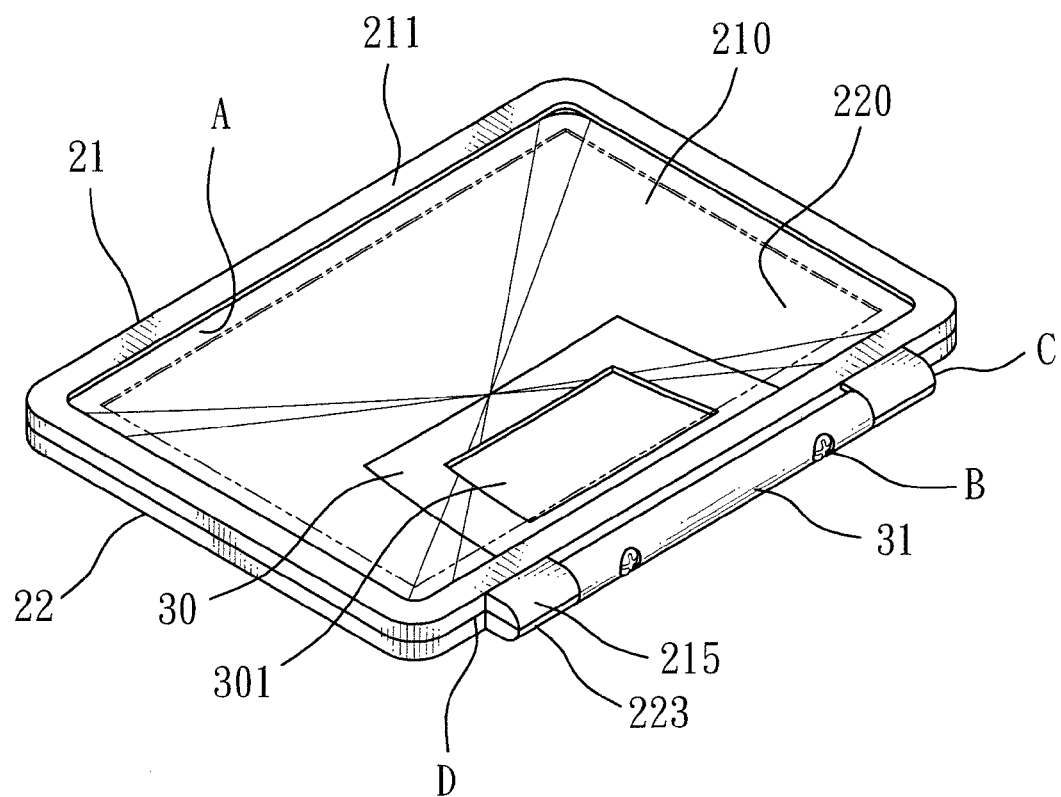
FIG. 3 is a perspective view of the invention.
Figure 4:
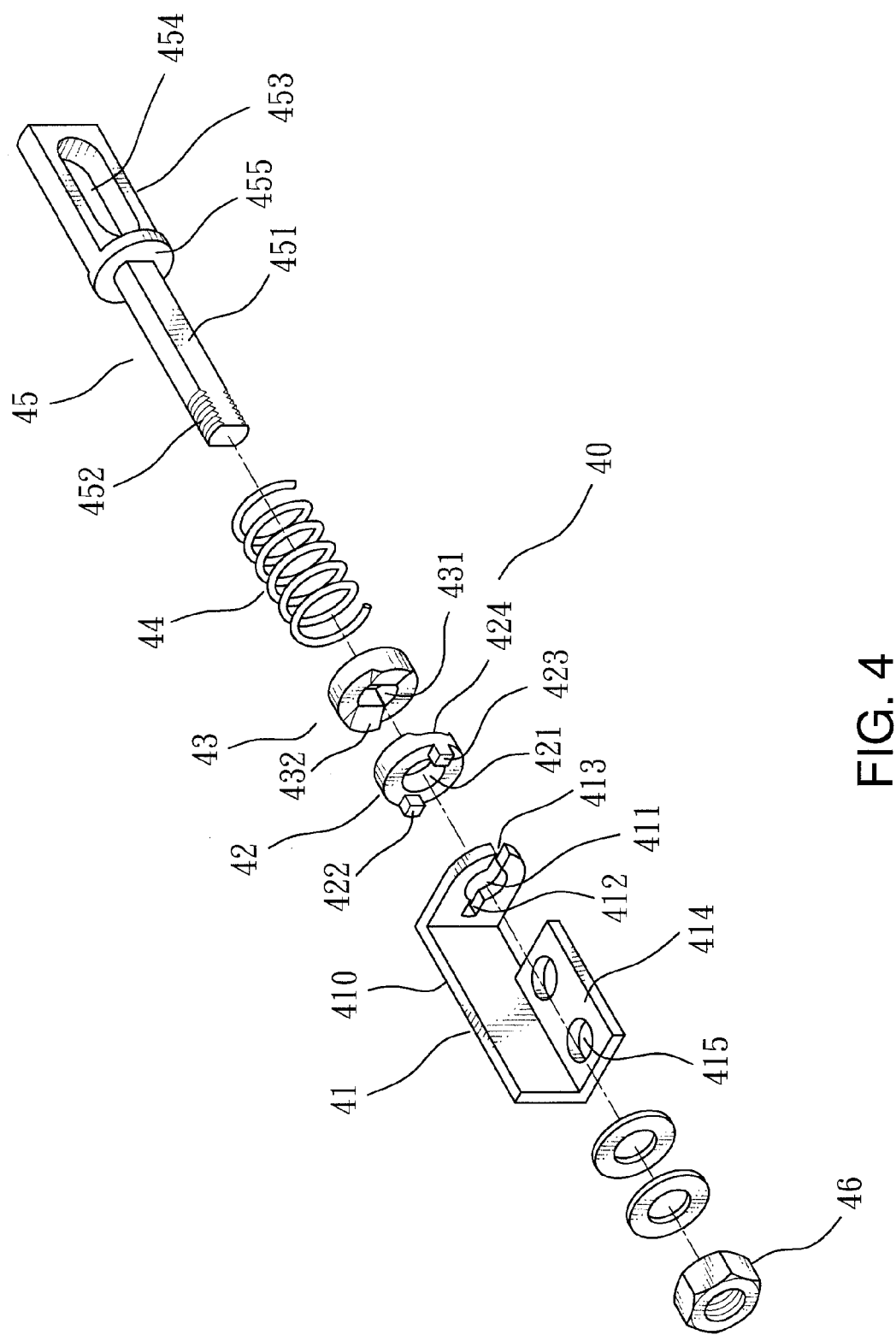
FIG. 4 is an exploded view of the hinge means of the invention.

Referring to FIGS. 2 and 3, the invention includes at least a protective cover body 2, a support lid 3 and a hinge assembly 4.

The protective cover body 2 includes an upper half portion 21 with a frame 211 and a view window 210 formed thereon, and an inner rim with an annular U-shaped trough A formed thereon to hold and encase the body of an electronic device 5, and a lower half portion 22 to cover the back side of the electronic device 5. The lower half portion 22 further has at least one storing notch 226.

The support lid 3 has a bottom side 31 with two ends formed respectively a pivotal portion 32. The bottom side 31 has one edge extended to form a lid plate 30 which has a grip aperture 301 formed thereon.

The hinge assembly 4 includes two hinge means 40. Each hinge means 40 has one end fastened to a lateral side D of the protective cover body 2 and another end held in the pivotal portion 32 of the support lid 30.

The protective cover body 2 further includes an upper half portion 21 to couple with the lower half portion 22. The upper half portion 21 has a first edge 212 extended vertically from the lateral side (referring to FIG. 5) with a distal end thereof formed a first side hook 213. The lower half portion 22 also has a corresponding second edge 221 extended vertically from the lateral thereof with a distal end formed a second side hook 222 engageable with the first side hook 213 to form a U-shaped trough A to hold and encase the electronic device 5.

The hinge assembly 4 includes the two hinge means 40 which have at least one resistant hinge consisting of a holder 41, a still slider 42, a movable slider 43, a spring 44, a pin 45 and a nut 46.

The holder 41 includes a L-shaped side plate 410 with a lower edge extended to form a flat plate 414, and a pin hole 411 at one side with one side thereof extended to form a horizontal notch 412 and a horizontal opening 413 at another side. The flat plate 414 has at least one aperture 415.

The still slider 42 has at least one hole 421 and two corresponding lugs 422 and 423 at one side to wedge in the horizontal notch 412 and horizontal opening 413, and an arched undulate first contact surface 424 on another side.

The movable slider 43 has an aperture 431 and an arched undulate second contact surface 432 on another side mating and in contact with the first contact surface 424.

The spring 44 has one end butting the movable slider 43 and another end butting an end surface 455 of the pin 45.

The pin 45 has a square stem 451 at one side that has a distal end formed a thread section 45 to fasten to the nut 46, and another side formed a flattened anchor head 453 with a slot 454 formed thereon.

The protective cover body 2 has the lateral side D formed two anchor portions C to be pivotally coupled with the hinge assembly 4. The two anchor portions C include two upper holders 215 on one lateral side 214 of the upper half portion 21 and two mating lower holders 223 at the lower half portion 22. Each lower holder 223 has a flat surface 224 to hold the flat plate 414 of the holder 41. The flat surface 224 has at least one aperture 225 corresponding to a screw hole 216 formed on the upper holder 215 to be fastened by a bolt B.

The pivotal portion 32 of the support lid 3 has a round hole 331 at a front section and a flattened hole 332 at a rear section to receive one end of the flattened anchor head 453, and is fastened through the bolt B by inserting into a screw hole 323 formed at one side of the flattened hole 332.

Figure 5:
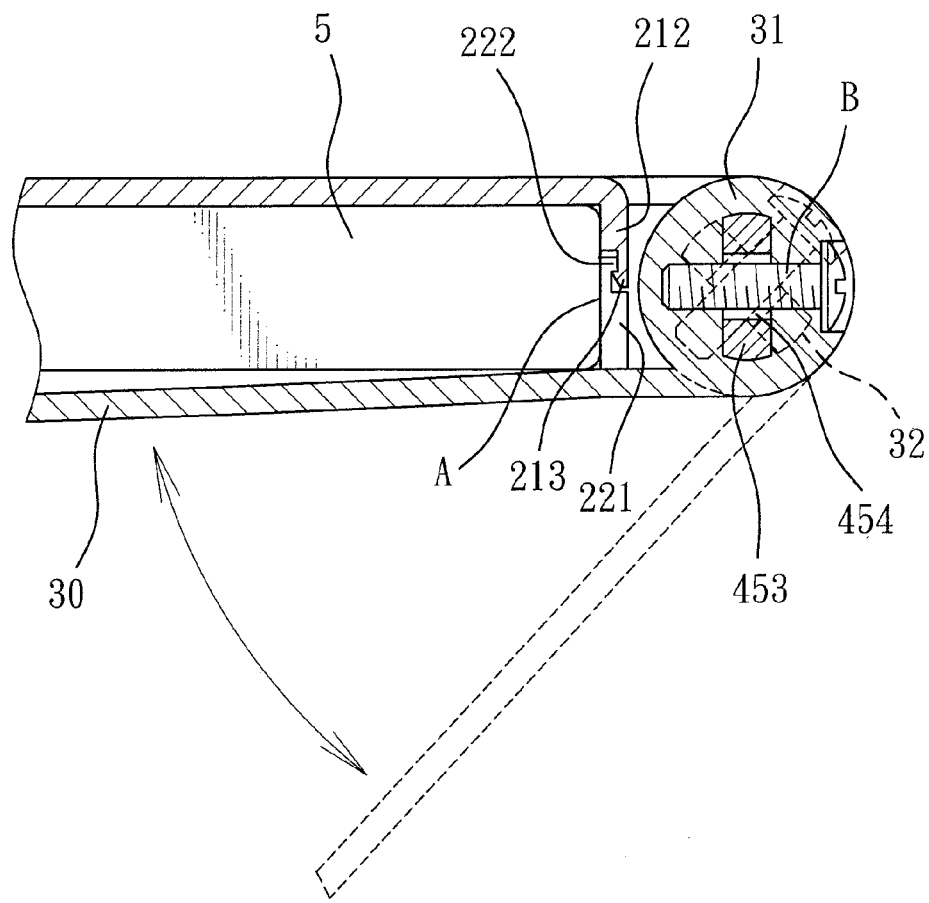
FIG. 5 is a fragmentary cross section of the hinge means of the invention.
Figure 6:
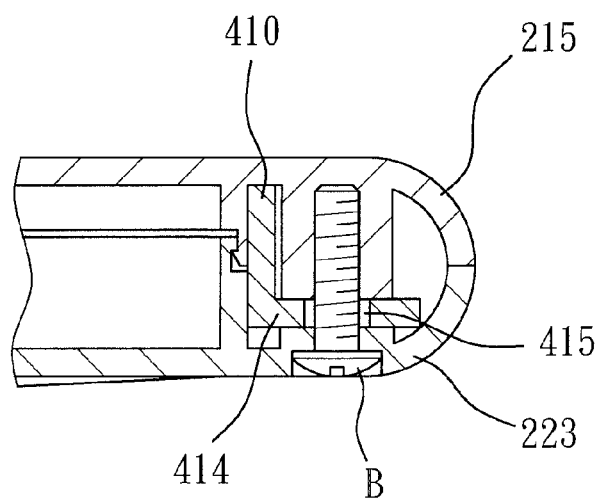
FIG. 6 is another fragmentary cross section of the hinge means of the invention.

For assembly, first, insert one end of the flattened anchor head 453 into the pivotal portion 32 of the support lid 3, and fasten the bolt B through the screw hole 323; then install the holder 41 between the upper holder 215 and the lower holder 223, and fasten the bolt B to form secure fastening (referring to FIGS. 5 and 6).

Figure 7:
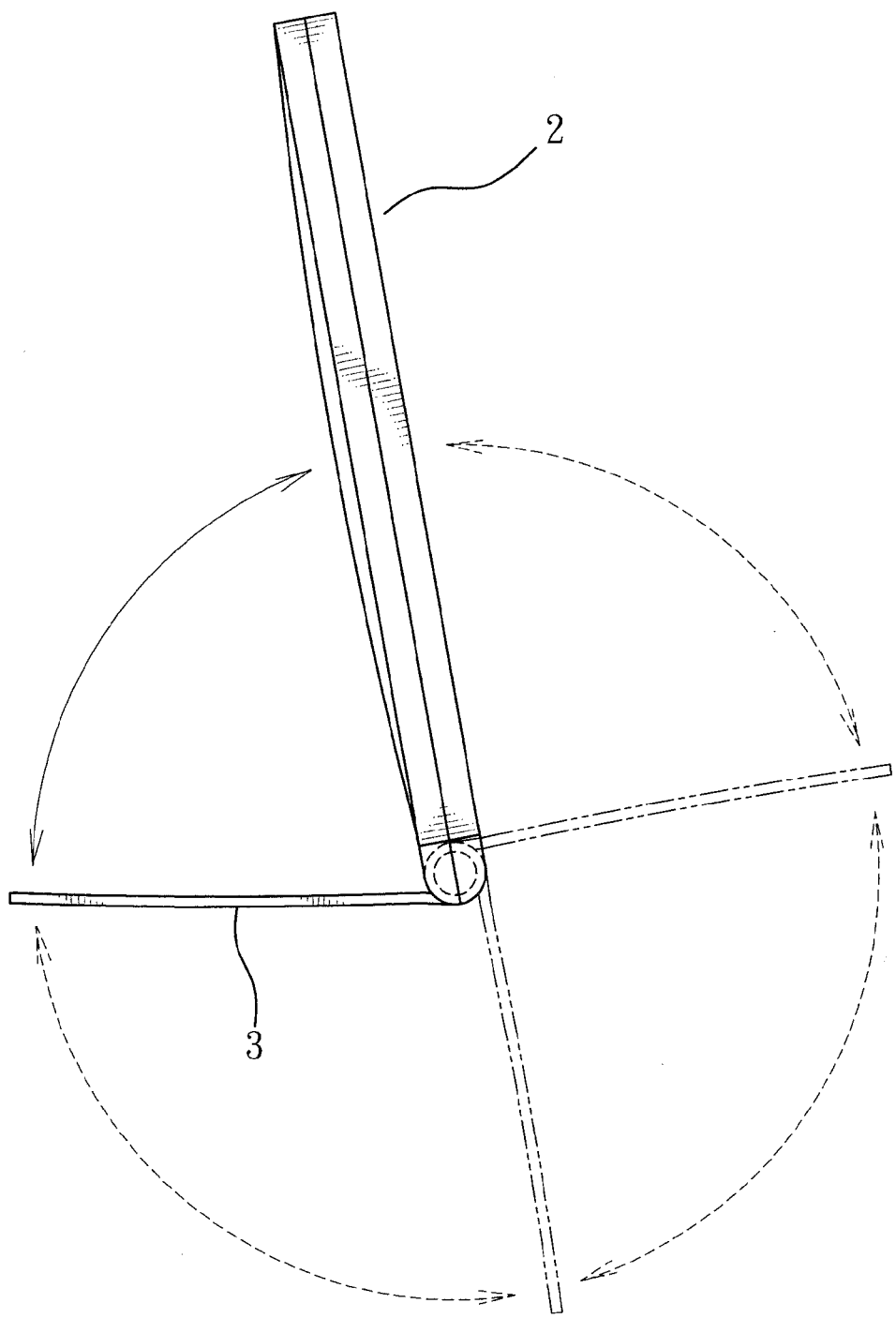
FIG. 7 is a schematic view of the invention showing the support lid at varying swivel angles.

By means of the structure set forth above, the support lid 3 has at least an angular adjustment space smaller than 360 degrees (referring to FIG. 7). Since at least one of the two hinge means 40 is a resistant hinge with the spring 44 butting the movable slider 43, and the second contact surface 432 of the movable slider 43 is in contact tightly with first contact surface 424 of the still slider 42, with the undulate arched surfaces formed on the first and second contact surfaces 424 and 432, the spring 44 provides a butting force greater than the weight of the electronic device and entire protective cover support rack when external forces are absent, hence the support lid 3 can be swiveled and maintained at any angle without moving.

Figure 8:
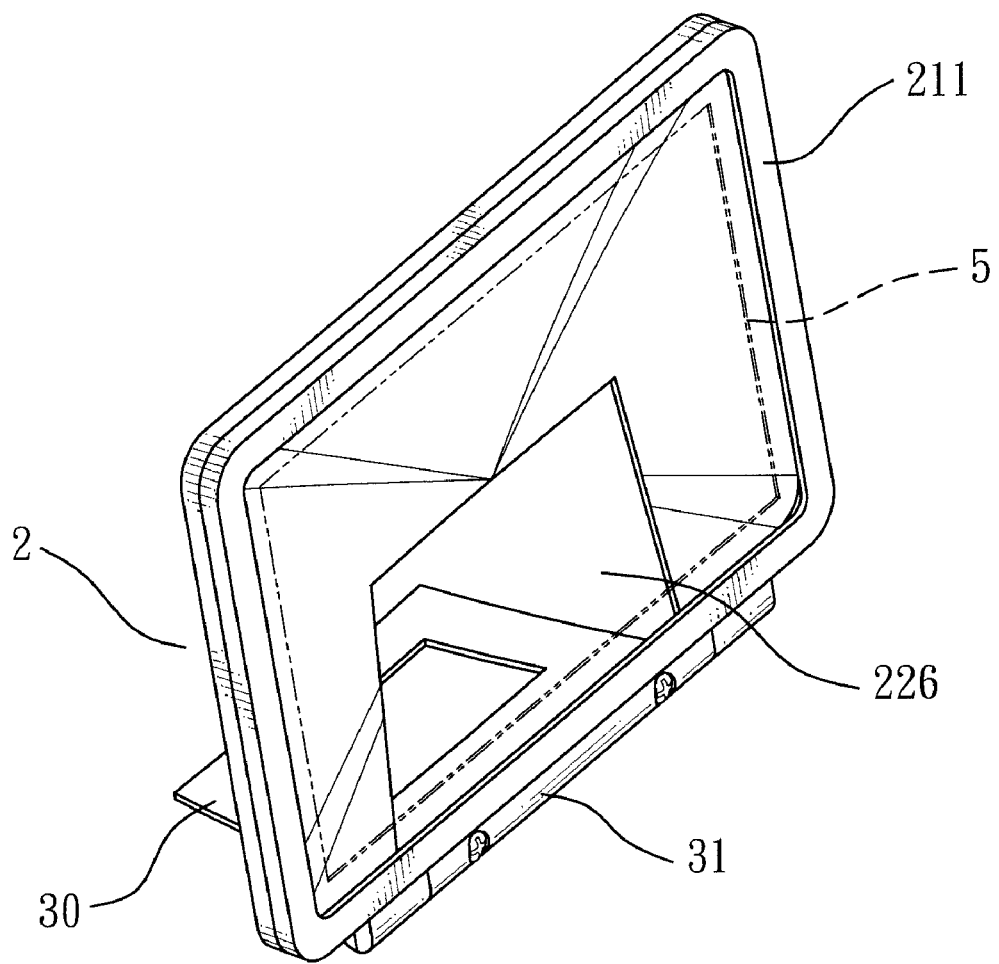
FIG. 8 is a schematic view of the invention in operating condition-1.
Figure 9:
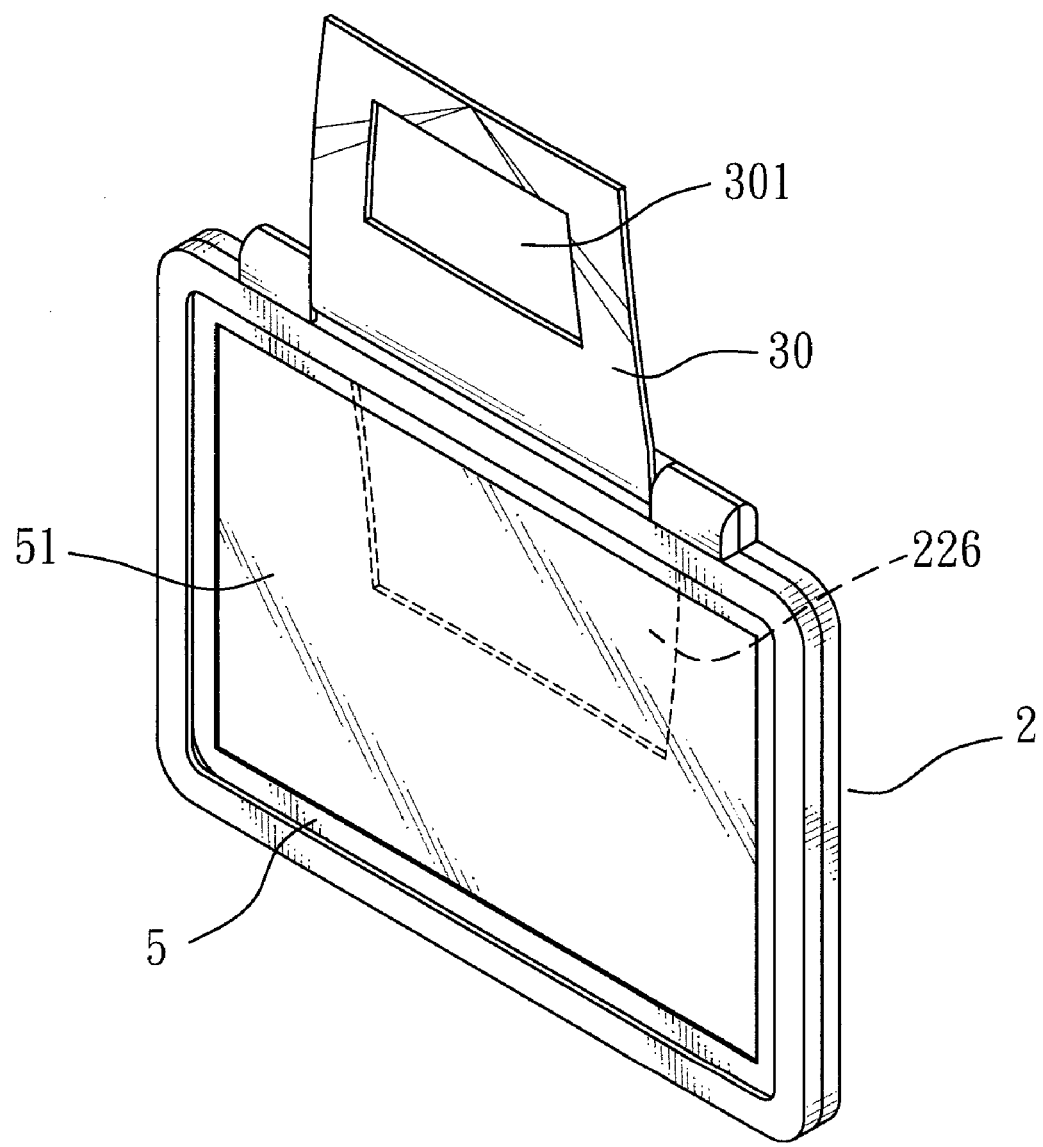
FIG. 9 is a schematic view of the invention in operating condition-2.

The support lid 3 may be swiveled to the front side according to requirements to protect the screen of the electronic device 5; or swiveled to hold the electronic device 5 at a standing position (as shown in FIG. 8); or flipped outwards close a horizontal position to allow user's fingers to insert through the grip aperture 301 to facilitate grasping and maneuvering on the touch screen 51 (referring to FIG. 9).

Figure 10:
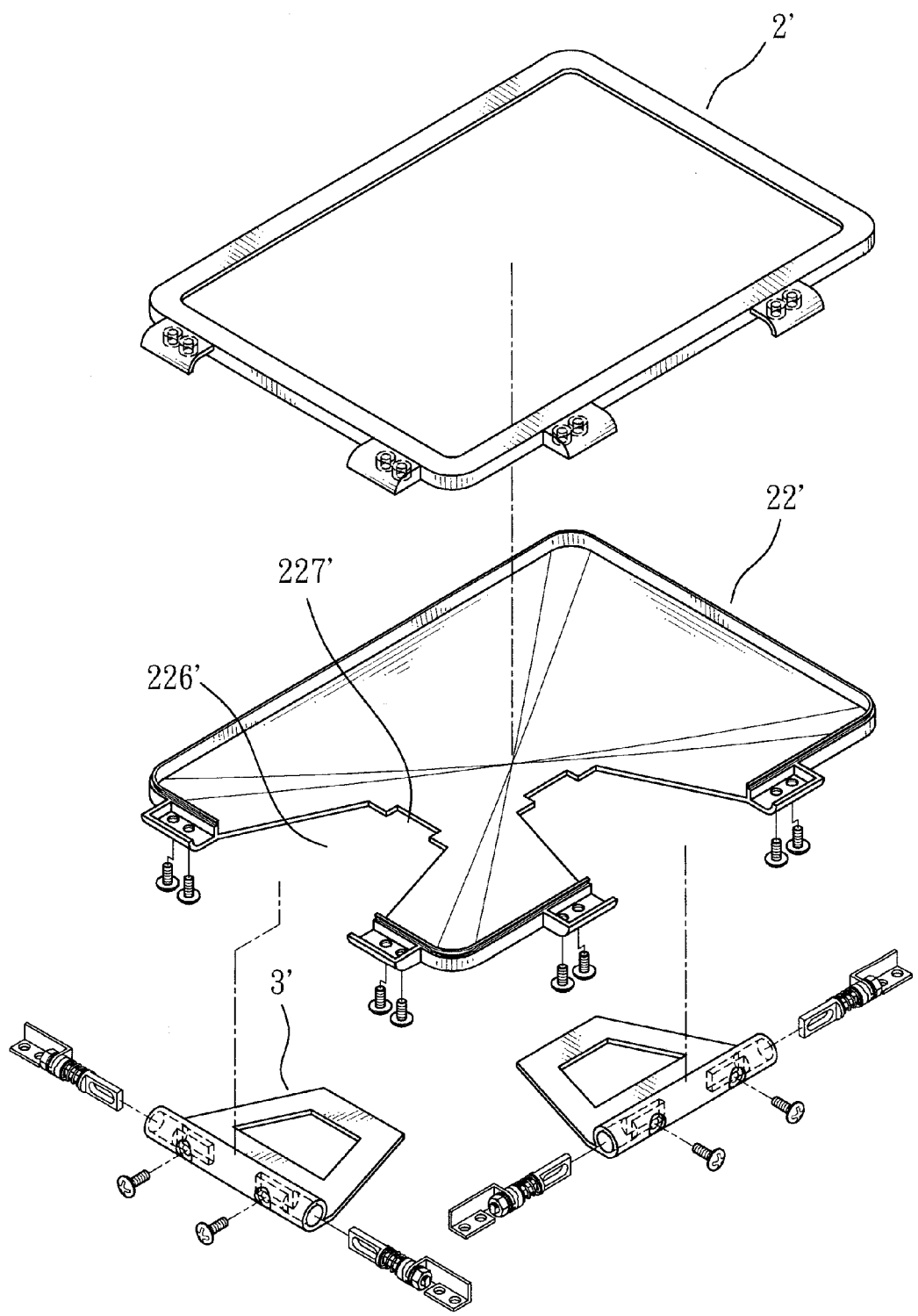
FIG. 10 is an exploded view of another embodiment of the invention.
Figure 11:
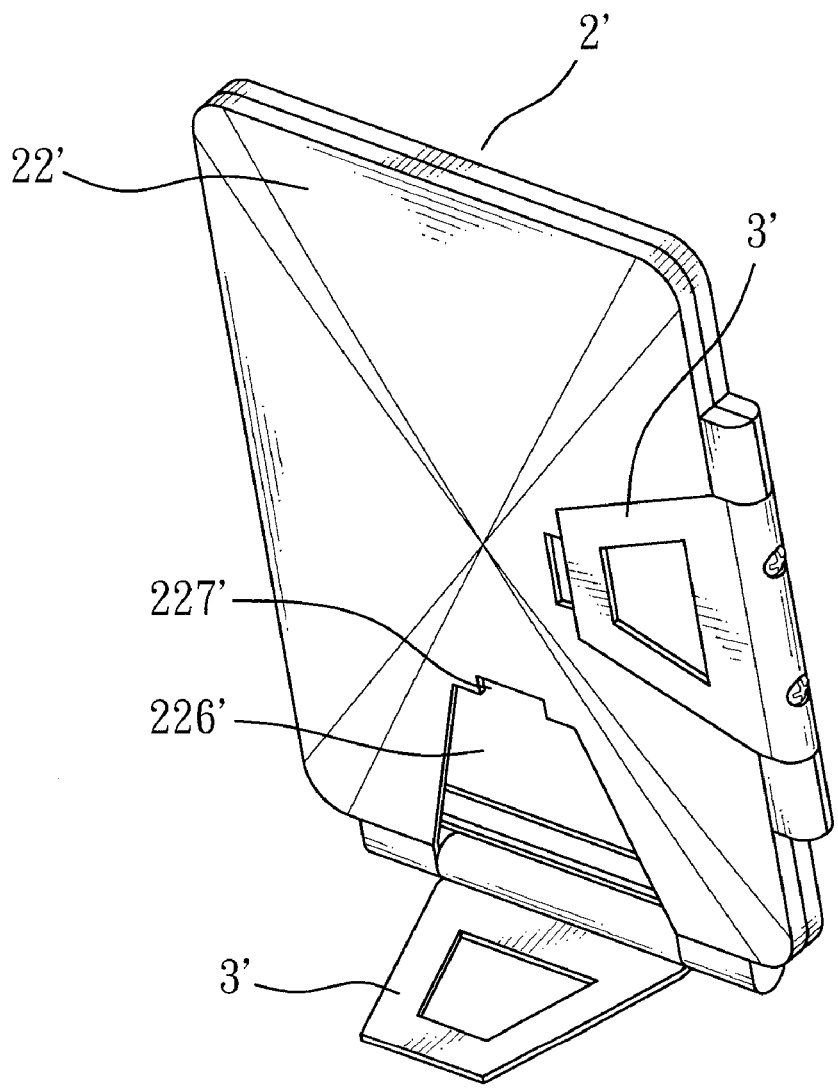
FIG. 11 is a schematic view of another embodiment of the invention in an operating condition.

Refer to FIGS. 10 and 11 for another embodiment of the invention. The protective cover body 2' has a lower half portion 22' with two storing notches 226' formed in different directions to hold and store two support lids 3'. To facilitate unfolding of the support lids 3' by fingers, a smaller notch 227' is formed respectively on the top of the storing notches 226' so that the support lids 3' can be easily flipped outwards from the folded condition.

I claim:

1. A protective cover support rack for electronic devices, comprising;

a protective cover body, the protective cover body including a frame and a view window, and an inner rim forming thereon an annular U-shaped trough to hold and encase a body of an electronic device;

a support lid, the support lid including a bottom side having two ends forming respectively a pivotal portion and a lid plate extended from a bottom side; and a hinge assembly, the hinge assembly comprising:

a holder, the holder coupled to a lateral side of the protective cover body;

a longitudinal member having a first end and a second end, the first end pivotally coupled to the holder and the second end coupled to the support lid;

a movable slider slidably disposed on the longitudinal member, the movable member having a first undulating surface matingly engaging an end of the holder; and a biasing member disposed on the longitudinal member between the movable slider and the holder;

wherein when the support lid is rotated about an axis of the longitudinal member, the biasing member acts to inhibit such rotation by biasing the first undulating surface of the movable slider against the holder.

2. The protective cover support rack of claim 1, wherein the support lid has a grip aperture.

3. The protective cover support rack of claim 1, wherein the protective cover body includes an upper half portion and a lower half portion coupled together.

4. The protective cover support rack of claim 1, wherein the protective cover body has a lateral side which includes two holders pivotally coupled with the hinge means, the two holders including two upper holders located on the lateral side of the protective cover body and two lower holders corresponding to the protective cover body.

5. The protective cover support rack of claim 3, wherein the upper half portion has a first edge extended vertically from one lateral side thereof, the first edge having a distal end forming a first side hook and the lower half portion has a second edge extended vertically from another lateral side thereof corresponding to the first edge, the first edge having a distal end forming a first side hook and the second side edge having another distal end forming a second side hook engageable with the first side hook to form the U-shaped trough.

6. The protective cover support rack of claim 1, wherein protective cover body contains a storing notch to hold the support lid.

* * * * *